(12) United States Patent
Hart et al.

(10) Patent No.: US 11,539,676 B2
(45) Date of Patent: Dec. 27, 2022

(54) ENCRYPTED TAGGING SYSTEM FOR PROTECTION OF NETWORK-BASED RESOURCE TRANSFERS

(71) Applicant: BANK OF AMERICA CORPORATION, Charlotte, NC (US)

(72) Inventors: Susan R. Hart, Addison, TX (US); Lisa Matthews, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 247 days.

(21) Appl. No.: 17/096,662

(22) Filed: Nov. 12, 2020

(65) Prior Publication Data
US 2022/0150223 A1    May 12, 2022

(51) Int. Cl.
*H04L 9/40* (2022.01)
*H04L 47/70* (2022.01)

(52) U.S. Cl.
CPC .......... *H04L 63/0428* (2013.01); *H04L 47/82* (2013.01); *H04L 63/10* (2013.01)

(58) Field of Classification Search
CPC ............................ H04L 63/0428; H04L 47/82
USPC ......................................................... 713/160
See application file for complete search history.

(56) References Cited

U.S. PATENT DOCUMENTS

| | | | | |
|---|---|---|---|---|
| 7,426,636 B1 * | 9/2008 | McGrew | ............... | H04L 9/3236 713/160 |
| 8,055,898 B2 * | 11/2011 | Yamamura | ............ | H04L 9/3228 713/168 |
| 8,310,346 B2 * | 11/2012 | Burbridge | ............. | H04L 9/3234 380/282 |
| 8,315,944 B2 | 11/2012 | Driemeyer et al. | | |
| 8,326,751 B2 | 12/2012 | Driemeyer et al. | | |
| 8,745,370 B2 * | 6/2014 | Chaves | ............... | H04L 63/0428 380/259 |
| 8,843,767 B2 * | 9/2014 | Hars | ................... | G06F 12/1408 713/190 |
| 8,862,870 B2 * | 10/2014 | Reddy | ..................... | H04L 67/56 713/153 |
| 8,886,942 B2 * | 11/2014 | Forte | ................... | G06F 21/6209 380/278 |
| 9,112,850 B1 * | 8/2015 | Eisen | .................. | H04L 63/1483 |
| 9,916,745 B2 | 3/2018 | Glamuzina, Jr. et al. | | |
| 10,614,478 B1 | 4/2020 | Georgi | | |
| 2003/0126435 A1 * | 7/2003 | Mizell | ..................... | H04W 4/24 713/168 |
| 2009/0083184 A1 * | 3/2009 | Eisen | .................. | H04L 63/1408 705/50 |

(Continued)

*Primary Examiner* — Amare F Tabor
(74) *Attorney, Agent, or Firm* — Moore & Van Allen PLLC; Nicholas C. Russell

(57) ABSTRACT

Embodiments of the invention are directed to systems, methods, and computer program products for protection of network-based resource transfers via the use of encrypted tags. As such, the system allows for generation of unique encrypted tags which encode authorization parameters for denominations of electronic resources. The system may then authorize or deny requested network-based transfers by utilizing a decryption module to access the authorization parameters for a specific electronic resource denomination. Furthermore, the system may manipulate the encrypted tags to alter the authorization parameters or to track an electronic resource denomination across multiple network-based transfers.

18 Claims, 5 Drawing Sheets

(56) References Cited

U.S. PATENT DOCUMENTS

| | | | | |
|---|---|---|---|---|
| 2009/0251289 | A1* | 10/2009 | Amtmann | H04L 63/0869 |
| | | | | 713/150 |
| 2013/0287210 | A1* | 10/2013 | Matsuda | G06F 21/6272 |
| | | | | 380/44 |
| 2014/0128153 | A1 | 5/2014 | Driemeyer et al. | |
| 2015/0150147 | A1* | 5/2015 | Keohane | H04L 63/102 |
| | | | | 726/28 |

* cited by examiner

ENCRYPTED TAGGING SYSTEM FOR PROTECTION OF NETWORK-BASED RESOURCE TRANSFERS

BACKGROUND

One of the reasons for the growing popularity of network-based resource transfers is anonymity, which creates an increased likelihood of unauthorized transfers. As such, a need exists for an encrypted tagging system of protection of network based transfers.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for protection of network-based resource transfers, the invention comprising: generating an encrypted tag associated with a denomination of electronic resources, wherein the tag indicates criteria for the acceptable use of the denomination of electronic resources; receiving, from a managing entity, a notification of a pending network-based resource transfer, wherein the notification includes the encrypted tags of the electronic resources to be transferred; decrypting the encrypted tags and determining whether the pending transfer meets the criteria for acceptable use of the denominations of resources; transmitting a notification to the managing entity, wherein the notification indicates whether the pending transfer meets the criteria for acceptable use of the denominations of resources; and editing the criteria for acceptable use of the denomination of resources, wherein editing the criteria comprises changing one or more authorization parameters in response to a notification from the managing entity.

In some embodiments, the criteria for the acceptable use of the denomination of electronic resources comprises information stored in a remote database and the encrypted tag comprises a lookup value for the stored information.

In some embodiments, determining whether the requested transfer meets the criteria for acceptable use of the denomination of resources further comprises accessing the remote database and identifying the criteria for acceptable use of the resources via the lookup value.

In some embodiments, the invention further comprises receiving, from a managing entity, a notification of an unauthorized network-based resource transfer.

In some embodiments, upon receipt of the notification of an unauthorized network-based resource transfer, the invention further comprises identifying the encrypted tags associated with an electronic resource amount used in the unauthorized transfer and executing a remedial action.

In some embodiments, the remedial action comprises creating a new electronic resource of an equivalent value of the identified electronic resource, setting the value of the identified electronic resource equal to zero, and transmitting a notification to the managing entity to deposit the new electronic resource into a user account.

In some embodiments, the remedial action further comprises either preventing the use of the identified electronic resource in further transactions or allowing the use of the identified electronic resource in further transactions and initiating a tracking procedure.

In some embodiments, the tracking procedure further comprises monitoring subsequent network-based transfers involving the same resource amount until the resource amount is converted to a different form factor.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
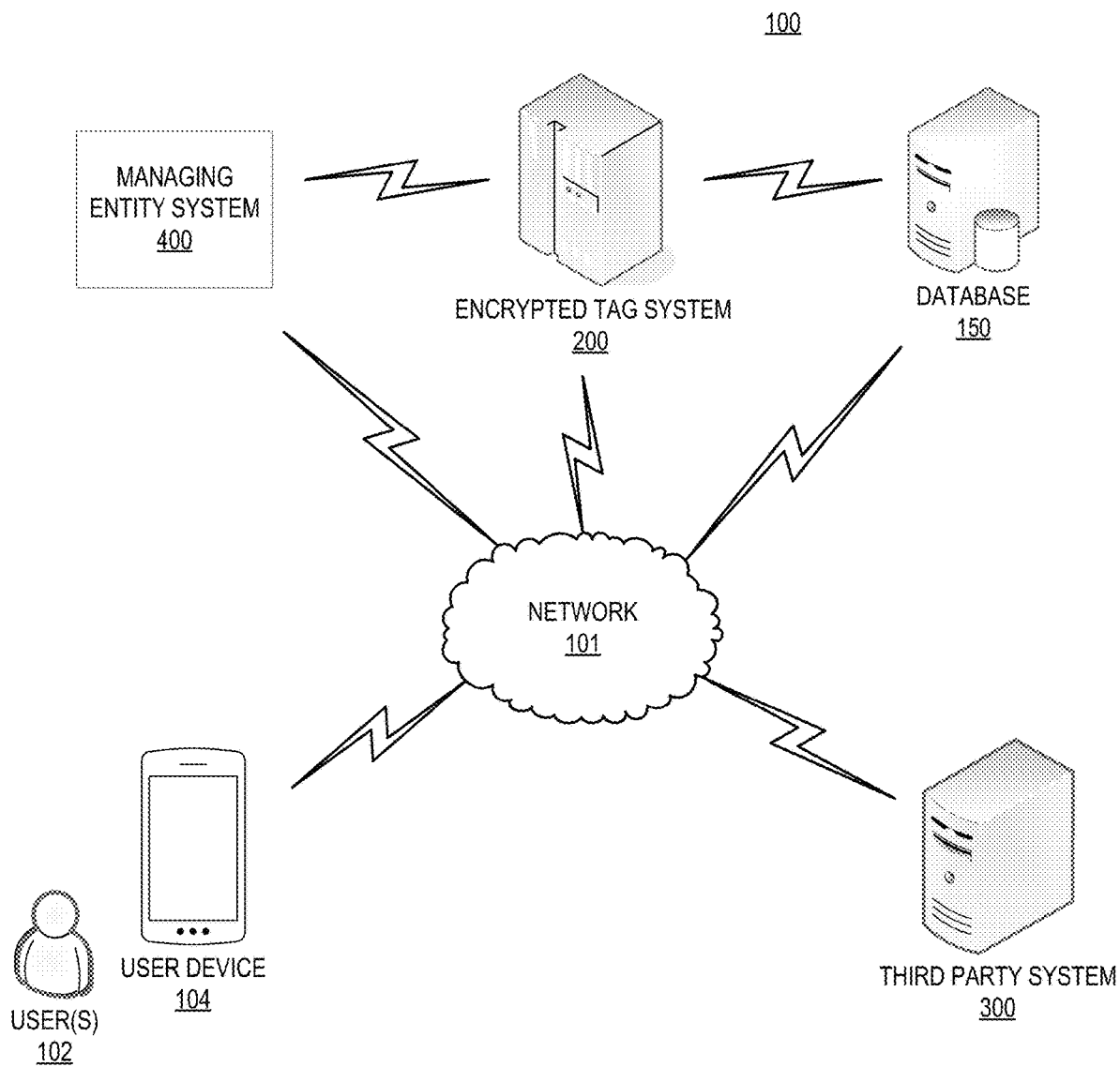
Figure 2:
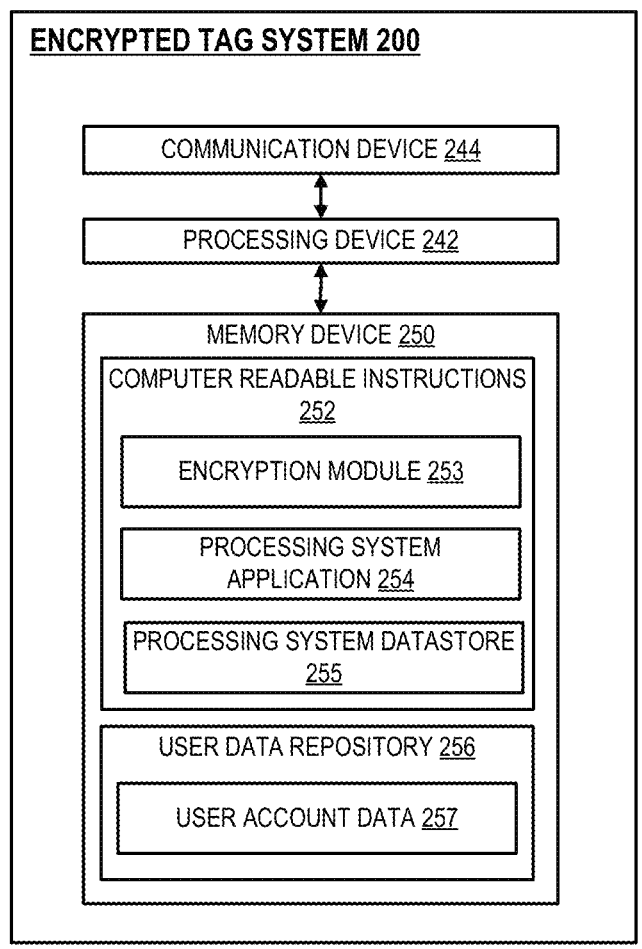
Figure 3:
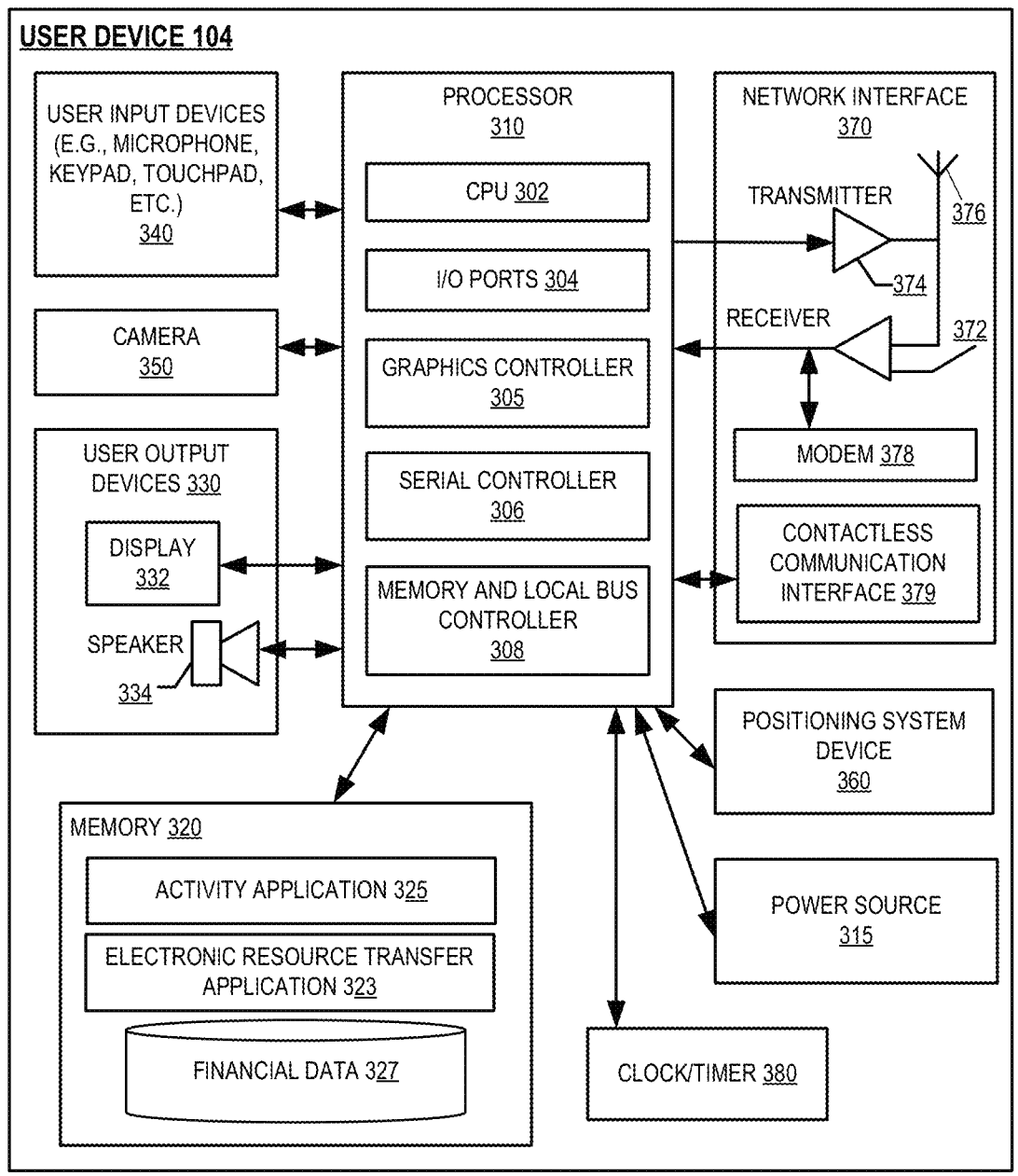
Figure 4:
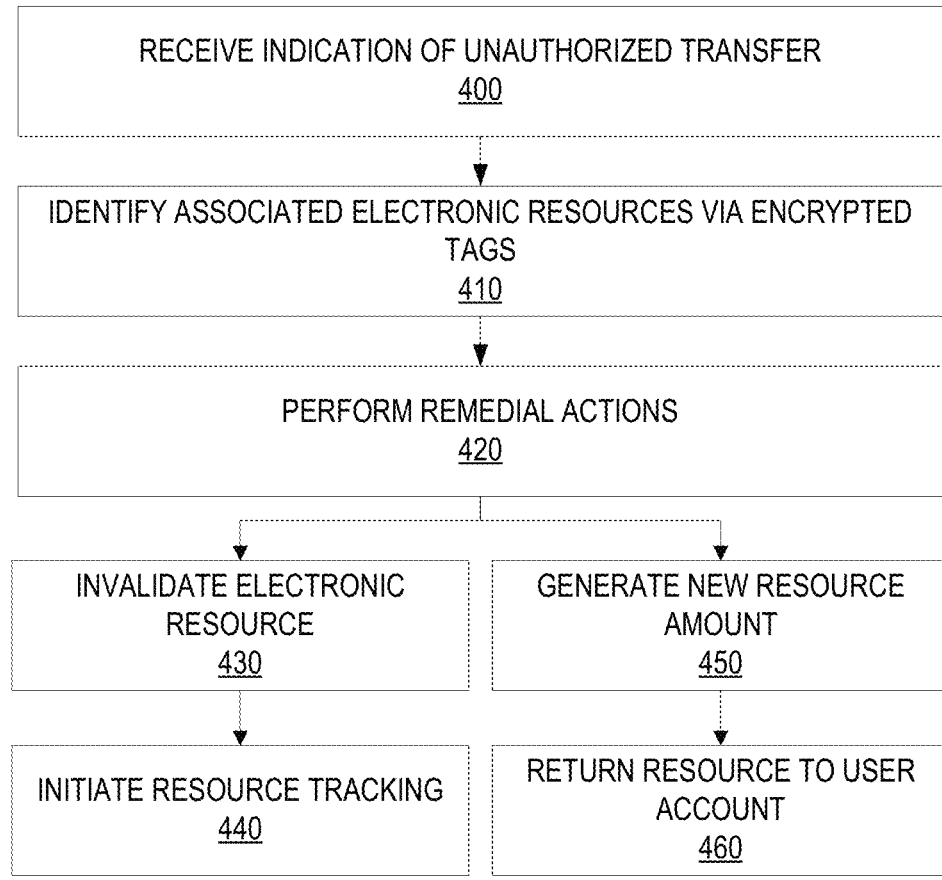
Figure 5:
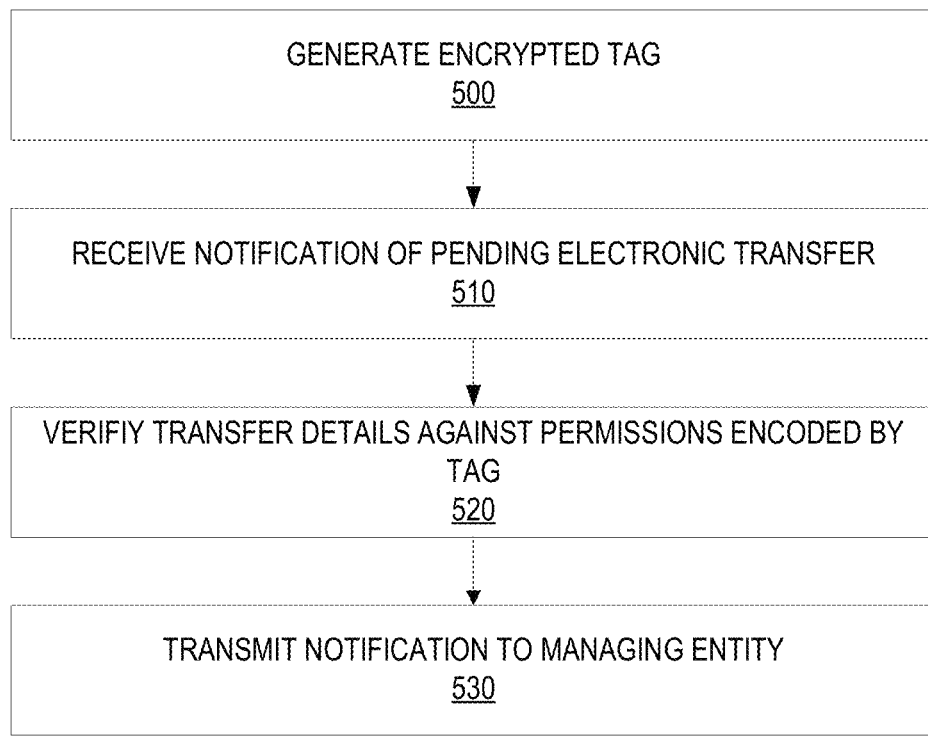

Having thus described embodiments of the invention in general terms, reference will now be made to the accompanying drawings, wherein:

FIG. 1 illustrates an operating environment for the encrypted tag system, in accordance with one embodiment of the present disclosure;

FIG. 2 is a block diagram illustrating the encrypted tag system;

FIG. 3 is a block diagram illustrating a user device associated with the encrypted tag system;

FIG. 4 is a flow diagram illustrating a process using the encrypted tag system, in accordance with one embodiment of the present disclosure; and FIG. 5 is a flow diagram illustrating a process using the encrypted tag system, in accordance with another embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity.

In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a computer terminal, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and computer terminals described herein. In other embodiments, a user may be a system or an entity performing one or more tasks described herein.

Accordingly, as used herein the term "user device" or "mobile device" may refer to mobile phones, personal computing devices, tablet computers, wearable devices, and/or any portable electronic device capable of receiving and/or storing data therein.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

"Tag" which may also be referred to as an "encrypted tag" or "encrypted token" as used herein may refer to metadata associated with an electronic resource amount, wherein the tag is formatted as a unique string of characters or the like. In some embodiments, the tag may contain such information an identifier of the resource account it originated from, geographical or time-based information, parameters for authorized use of the resource amount, or any such descriptive information. In other embodiments, the descriptive information is stored in a remote database associated with an entity, wherein the tag serves as an encrypted lookup value for the information. The tag may be encrypted by various methods or algorithms.

The system allows for increased security of network-based resource transfers by generating an encrypted tag for a denomination of electronic resources in a user's account. In some embodiments of the invention, the tag is decrypted by a processing system at the time a request for a network-based transfer is initiated. In these embodiments, the information provided in the tag allows the processing system to determine whether a managing entity should allow or deny the transaction, preventing unauthorized transactions from occurring before the electronic resources are transferred. In other embodiments, the tag is utilized after the occurrence of an unauthorized transaction, wherein the processing system may edit the information encoded by the tag to invalidate the electronic resource amount or to initiate tracking of the resource amount throughout subsequent network-based transfers. In this way, a user may benefit from having a resource amount easily returned to a personal account, while a managing entity may benefit from the ability to identify other users or accounts which are participating in unauthorized transactions.

FIG. 1 illustrates an operating environment 100 for the encrypted tagging system, in accordance with one embodiment of the present disclosure. As illustrated, the system environment 100 may comprise a user device 104 in operative communication with one or more third party systems 300 via a network 101. The system environment also includes a user 102, a managing entity system 400, an encrypted tag system 200, a database 150, and/or other systems/devices not illustrated herein and connected via a network 101. As such, the user device 104 is configured such that the user 102 may complete a resource transfer with the third party system 300 by establishing operative communication channels between the user device 104, the managing entity system 400, and the third party system 300 via a wireless network.

Typically, the encrypted tagging system 200 and the database 150 are in operative communication with the managing entity system 400, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 300). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 400 may comprise a communication module and memory not illustrated, and may be configured to establish operative communication channels with a third party system 300 and a user device 104 via a network 101. The managing entity may comprise a user data repository which stores user account data. This data may be used by the managing entity to facilitate network-based transfers between the user device and third party system. In some embodiments, the managing entity system is in operative communication with the encrypted tag system 200 and database 150 via a private communication channel. The private communication channel may be via a network 101 or the encrypted tag system 200 and database 150 may be fully integrated within the managing entity system 400.

As will be discussed in greater detail in FIG. 4 and FIG. 5, the managing entity system 400 may communicate with the encrypted tag system 200 in order to verify a transfer request between a user device and third party system. In some embodiments, the managing entity may utilize the features and functions of the encrypted tag system to proactively determine whether to authorize or deny a pending transfer request. In other embodiments, the managing entity may utilize the encrypted tag system to react to and remediate instances of unauthorized account activity by dynamically altering the permissions associated with specific electronic resource amounts.

FIG. 2 illustrates a block diagram of the encrypted tag system 200 associated with the operating environment 100, in accordance with embodiments of the present invention. As illustrated in FIG. 2, the encrypted tag system 200 may include a communication device 244, a processing device 242, and a memory device 250 having an encryption application/module 253, a processing system application 254 and a processing system datastore 255 stored therein. As shown, the processing device 242 is operatively connected to and is configured to control and cause the communication device 244, and the memory device 250 to perform one or more functions. In some embodiments, the encryption module 253 and/or the processing system application 254 comprises computer readable instructions that when executed by the processing device 242 cause the processing device 242 to perform one or more functions and/or transmit control instructions to the database 150, the managing entity system 400, and/or the communication device 244. It will be understood that the encryption module 253 and/or the processing system application 254 may be executable to initiate, perform, complete, and/or facilitate one or more portions of any embodiments described and/or contemplated herein, and specifically embodiments directed to user activities. The encryption module 253 may comprise executable instructions associated with generation and decryption of encrypted tags, and may be embodied within the processing system application 254 in some instances. The encrypted tag system 200 may be owned by, operated by and/or affiliated with the same managing entity that owns or operates the managing entity system 400. In some embodiments, the encrypted tag system 200 is fully integrated within the managing entity system 400.

The communication device 244 may generally include a modem, server, transceiver, and/or other devices for communicating with other devices on the network 101. The network communication device 244 may be a communication interface having one or more communication devices configured to communicate with one or more other devices on the network 101, such as the encrypted tag system 200, the user device 104, other processing systems, data systems, etc.

Additionally, referring to encrypted tag system 200 illustrated in FIG. 2, the processing device 242 may generally refer to a device or combination of devices having circuitry used for implementing the communication and/or logic functions of the encrypted tag system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the system 200 may be allocated between these processing devices according to their respective capabilities. The processing device 242 may further include functionality to operate one or more software programs based on computer-executable program code 252 thereof, which may be stored in a memory device 250, such as the processing system application 254 and the encryption module 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the encrypted tag system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

FIG. 3 illustrates a block diagram of the user device associated with the encrypting tagging system environment 100, in accordance with embodiments of the present invention. The user device 104 may include a user mobile device or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices.

The mobile device 104 may generally include a processing device or processor 310 communicably coupled to devices such as, a memory device 320, user output devices 330 (for example, a user display device 332, or a speaker 334), user input devices 340 (such as a microphone, keypad, touchpad, touch screen, and the like), a communication device or network interface device 370, a power source 315, a clock or other timer 380, a visual capture device such as a camera 350, a positioning system device 360, such as a geo-positioning system device like a GPS device, an accelerometer, and the like, one or more chips, and the like. The processor 310 may further include a central processing unit 302, input/output (I/O) port controllers 304, a graphics controller 305, a serial bus controller 306 and a memory and local bus controller 308.

The processor 310 may include functionality to operate one or more software programs or applications, which may be stored in the memory device 320. For example, the processor 310 may be capable of operating applications such as the activity application 325, a electronic resource transfer application 323, or a web browser application. The activity application 325 may then allow the mobile device 104 to transmit and receive data and instructions to or from the third party system 300 (for example, via wireless communication or NFC channels), data and instructions to or from the processing system 200, web content, such as, for example, location-based content and/or other web page content, according to a Wireless Application Protocol (WAP), Hypertext Transfer Protocol (HTTP), and/or the like.

The electronic resource transfer application 323 and the financial data module 327, together may include the necessary circuitry to provide electronic resource information storage and transmission functionality and transmitter device signal encoding and decoding functionality to the mobile device 104, for secure transmission of electronic transaction requests via the network 101.

The processor 310 may be configured to use the network interface device 370 to communicate with one or more other devices on a network 101 such as, but not limited to the third party system 300 and the processing system 200. In this regard, the network interface device 370 may include an antenna 376 operatively coupled to a transmitter 374 and a receiver 372 (together a "transceiver"), modem 378 and a contactless communication interface 379. The processor 310 may be configured to provide signals to and receive signals from the transmitter 374 and receiver 372, respectively. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The network interface device 370 or communication device 370 may also include a user activity interface presented in user output devices 330 in order to allow a user 102 to execute some or all of processes described herein. The application interface may have access to the hardware, for example, the transceiver, and software previously described with respect to the network interface device 370. Furthermore, the application interface may have the ability to connect to and communicate with an external data storage on a separate system within the network 101. As described above, the mobile device 104 includes a display device 332 having a user interface that includes user output devices 330 and/or user input devices 340. The user output devices 330 may include a display 332 (e.g., a liquid crystal display (LCD) or the like) and a speaker 334 or other audio device, which are operatively coupled to the processor 310. The user input devices 340, which may allow the mobile device 104 to receive data from the user 102, may include any of a number of devices allowing the mobile device 104 to receive data from a user 102, such as a keypad, keyboard, touchscreen, touchpad, microphone, mouse, joystick, other pointer device, button, soft key, and/or other input device(s).

The mobile device 104 may further include a power source 315. Generally, the power source 315 is a device that supplies electrical energy to an electrical load. In some embodiment, power source 315 may convert a form of energy such as solar energy, chemical energy, mechanical energy, and the like, to electrical energy. Generally, the power source 315 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 315 may be a power adapter that can connect a power supply from a power outlet to the mobile device 104. In such embodiments, a power adapter may be classified as a power source "in" the mobile device 104.

The mobile device 104 may also include a memory buffer, cache memory or temporary memory device operatively coupled to the processor 310. Typically, one or more applications 325 and 323, are loaded into the temporarily memory during use. As used herein, memory may include any computer readable medium configured to store data, code, or other information. The memory device 320 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the encrypted tag system 200 performing one or more steps described herein in conjunction with other devices and systems, either automatically based on executing computer readable instructions of the memory device 250, or in response to receiving control instructions from the managing entity system 400. In some instances, the system refers to the devices and systems on the network environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 is a high-level process flow diagram illustrating a process using the encrypted tagging system, in accordance with one embodiment of the present disclosure. The process begins at block 400, where the system receives a notification that an unauthorized transaction has occurred. In some embodiments, this could be achieved by a user making a report to a managing entity that an unauthorized resource transfer has occurred or otherwise indicating that a second, unauthorized user has obtained access to the user device or account information. In other embodiments, a managing entity may determine that a resource transfer of an unusual amount or type occurred, or that the user account was otherwise compromised in some way. "Unusual" as used herein may refer to a transfer which is determined to be above a predetermined threshold of difference between from historical transfers from the same account or from an aggregate of accounts belonging to users with shared geographic location or the like.

The process may then continue to block 410, wherein for each transaction marked as unauthorized, the electronic resource amounts associated with each transaction are identified via their encrypted tags. The tags may be utilized as a database lookup value, in which each tag operates as a unique identifier for locating a set of stored data associated with the transaction in database 150. In other embodiments, the tag itself may be decrypted via the encryption module 253 to identify the resource amount involved in the transaction. After identification, the system may perform a plurality of actions or remediation steps 420. The remediation steps 430, 440, 450, and 460 are not mutually exclusive, nor are they required to be executed in a particular sequential order.

In block 430 of FIG. 4, after identification of a specific resource amount used in an unauthorized transaction, the associated encrypted tag is altered via the encrypted tag system 200 to invalidate the value of the electronic resource. In some embodiments, this occurs by setting the value of the resource amount equal to zero, while in other embodiments, the permissions of the resource amount are altered in such a way that the electronic resource is unable to be used in further transactions.

Additionally, in some embodiments, the system may then initiate tracking 440 of the altered encrypted tag. In such embodiments, the electronic resource may have been altered via the encrypted tag system 200 in such a way that despite having been invalidated, it continues to appear valid to a user as long as it remains in an electronic form factor. In this way, the managing entity can monitor the specific resource through multiple subsequent electronic transfers until the resource is converted into another form factor such as a deposit to a checking account or a cash withdrawal. This step may be especially beneficial in identifying a situation in which multiple users appear to participate in suspicious activity, but the multiple electronic resources are funneled into one centralized account.

Furthermore, in some embodiments, the system may initiate a remedial action 450 of creating a new resource amount equal to the value of the invalidated resource. The new resource may be transferred 460 back into an account held by the user 102. In this embodiment, a new encrypted tag may be generated by the encrypted tag system 200 for the returned resource amount.

FIG. 5 is a high-level process flow diagram illustrating a process using the encrypted tagging system, in accordance with another embodiment of the present disclosure. The process begins at block 500, wherein an encrypted tag is generated via the encrypted tag system 200 for a unique electronic resource amount. As previously disclosed, the encrypted tag may serve as a lookup value for a dataset in a remote database 150 or in other embodiments, the tag itself may contained encrypted data identifying the resource amount, an authorized user of the resource, or the like.

The process continues in block 510, wherein an electronic transfer is initiated by a user 102. As previously disclosed, the transfer may be in the form of a payment, request for payment, transfer between multiple accounts held by one user, or the like. After the transfer is initiated, the encrypted tag system 200 receives the encrypted tag associated with each resource amount involved in the transaction via the communication device 244 and verifies the transaction 520. In some embodiments, the tag is decrypted via the encryption module 253 and the information contained in the tag, i.e. the resource amount, authorized user, permissions, etc is compared to the information of the requested transaction to ensure that the resource amount is authorized to be used in the particular transaction. In other embodiments, the tag may be used to access authorization information contained in a remote database 150 operated by a managing entity, wherein the authorization information is compared to the requested transaction to ensure that the resource amount is authorized to be used in the particular transaction.

The process continues in block 530, wherein the encrypted tag system 200 transmits a notification to the managing entity system 400. If the permissions encoded by the encrypted tag indicate that the requested transaction should be authorized, then notification will indicate that the electronic resource amount should be transferred as requested by the user. If the tag indicates, however, that the transaction was not initiated by an authorized user or if there is any other discrepancy between the permissions encoded by the tag and the transaction request, the notification will indicate that the transaction should be denied. In some embodiments, the managing entity system 400 may transmit a notification to the user device 104 indicating why the transaction was denied and may also provide the user an opportunity to make another transaction attempt.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for protection of network-based resource transfers, the system comprising:
   a memory device with computer-readable program code stored thereon;
   a communication device;
   a processing device operatively coupled to the memory device and the communication device, wherein the processing device is configured to execute the computer-readable program code to:
   generate an encrypted tag associated with a denomination of electronic resources, wherein the encrypted tag indicates criteria for acceptable use of the denomination of electronic resources, wherein the criteria include one or more authorization parameters set by a managing entity;
   receiving, from a managing entity, a notification of an unauthorized network-based resource transfer;
   identifying an encrypted tag associated with an electronic resource amount used in the unauthorized transfer and execute a remedial action, wherein the remedial action comprises creating a new electronic resource of an equivalent value of an identified electronic resource, setting a value of the identified electronic resource equal to zero, and transmitting a notification to the managing entity to deposit the new electronic resource into a user account; and
   edit the criteria for acceptable use of the denomination of resources, wherein editing the criteria comprises changing one or more authorization parameters in response to a notification from the managing entity.

2. The system of claim 1, wherein the criteria for acceptable use of the denomination of electronic resources comprises information stored in a remote database and wherein the encrypted tag comprises a lookup value for the stored information.

3. The system of claim 2, wherein determining whether the pending network-based resource transfer meets the criteria for acceptable use of the denomination of resources further comprises accessing the remote database and identifying the criteria for acceptable use of the resources via the lookup value.

4. The system of claim 1, wherein the remedial action further comprises either preventing use of the identified electronic resource in further transactions or allowing use of the identified electronic resource in further transactions and initiating a tracking procedure.

5. The system of claim 4, wherein the tracking procedure further comprises monitoring subsequent network-based transfers involving the identified resource amount until the resource amount is converted to a different form factor.

6. A computer program product for protection of network-based resource transfers with at least one non-transitory computer-readable medium having computer-readable program code portions embodied therein, the computer-readable program code portions comprising:
  an executable portion configured for generating an encrypted tag associated with a denomination of electronic resources, wherein the encrypted tag indicates criteria for acceptable use of the denomination of electronic resources, wherein the criteria include one or more authorization parameters set by a managing entity;
  an executable portion configured for receiving, from a managing entity, a notification of an unauthorized network-based resource transfer;
  an executable portion configured for identifying an encrypted tag associated with an electronic resource amount used in the unauthorized transfer and execute a remedial action, wherein the remedial action comprises creating a new electronic resource of an equivalent value of an identified electronic resource, setting a value of the identified electronic resource equal to zero, and transmitting a notification to the managing entity to deposit the new electronic resource into a user account; and
  an executable portion configured for editing the criteria for acceptable use of the denomination of resources, wherein editing the criteria comprises changing one or more authorization parameters in response to a notification from the managing entity.

7. The computer program product of claim 6, wherein the criteria for acceptable use of the denomination of electronic resources comprises information stored in a remote database and wherein the encrypted tag comprises a lookup value for the stored information.

8. The computer program product of claim 7, wherein determining whether the pending network-based resource transfer meets the criteria for acceptable use of the denomination of resources further comprises an executable portion configured for accessing the remote database and identifying the criteria for acceptable use of the resources via the lookup value.

9. The computer program product of claim 6, wherein the remedial action further comprises either preventing the use of the identified electronic resource in further transactions or allowing the use of the identified electronic resource in further transactions and initiating a tracking procedure.

10. The computer program product of claim 9, wherein the tracking procedure further comprises monitoring subsequent network-based transfers involving the identified resource amount until the resource amount is converted to a different form factor.

11. A computer-implemented method for protection of network-based resource transfers, the method comprising:
  providing a computing system comprising a computer processing device and a non-transitory computer readable medium, where the computer readable medium comprises configured computer program instruction code, such that when said instruction code is operated by said computer processing device, said computer processing device performs the following operations:
  generating an encrypted tag associated with a denomination of electronic resources, wherein the encrypted tag indicates criteria for acceptable use of the denomination of electronic resources, wherein the criteria include one or more authorization parameters set by a managing entity;
  receiving, from a managing entity, a notification of an unauthorized network-based resource transfer;
  identifying an encrypted tag associated with an electronic resource amount used in the unauthorized transfer and execute a remedial action, wherein the remedial action comprises creating a new electronic resource of an equivalent value of an identified electronic resource, setting a value of the identified electronic resource equal to zero, and transmitting a notification to the managing entity to deposit the new electronic resource into a user account; and
  editing the criteria for acceptable use of the denomination of resources, wherein editing the criteria comprises changing one or more authorization parameters in response to a notification from the managing entity.

12. The computer-implemented method of claim 11, wherein the criteria for the acceptable use of the denomination of electronic resources comprises information stored in a remote database and wherein the encrypted tag comprises a lookup value for the stored information.

13. The system of claim 1, wherein the processing device is further configured to receive, from the managing entity, a notification of a pending network-based resource transfer, wherein the notification includes the encrypted tag of the denomination of electronic resources to be transferred.

14. The system of claim 13, wherein upon receipt of the notification, the processing device is further configured to decrypt the encrypted tag and confirm that the pending network-based resource transfer meets the criteria for acceptable use of resources.

15. The system of claim 13, wherein the processing device is further configured to transmit a notification to the managing entity, wherein the notification comprises a confirmation that the pending network-based transfer meets the criteria for acceptable use of the denomination of resources.

16. The computer program product of claim 6, further comprising an executable portion configured for receiving, from the managing entity, a notification of a pending network-based resource transfer, wherein the notification includes the encrypted tag of the denomination of electronic resources to be transferred.

17. The computer program product of claim 16, further comprising an executable portion configured for decrypting the encrypted tag and confirm that the pending network-based resource transfer meets the criteria for acceptable use of resources.

18. The computer program product of claim 16, further comprising an executable portion configured for transmitting a notification to the managing entity, wherein the notification comprises a confirmation that the pending network-based transfer meets the criteria for acceptable use of the denomination of resources.

* * * * *